United States Patent
Slepyan et al.

(10) Patent No.: US 6,766,045 B2
(45) Date of Patent: Jul. 20, 2004

(54) CURRENCY VERIFICATION

(75) Inventors: Edward Slepyan, Alfey Menashe (IL); Alexander Kugel, Netanya (IL); Julia Eisenberg, Petach Tikva (IL)

(73) Assignee: Digital Verification Ltd., Petach Tikva (IL)

( * ) Notice: Subject to any disclaimer, the term of this patent is extended or adjusted under 35 U.S.C. 154(b) by 0 days.

(21) Appl. No.: 10/094,941

(22) Filed: Mar. 11, 2002

(65) Prior Publication Data

US 2003/0169899 A1 Sep. 11, 2003

(51) Int. Cl.[7] .............................................. G06K 9/68
(52) U.S. Cl. .................. 382/135; 382/218; 382/225; 382/278; 340/5.86
(58) Field of Search .............................. 382/135, 137, 382/225, 217, 218, 278, 100; 283/113; 340/5.86; 356/71; 708/813

(56) References Cited

U.S. PATENT DOCUMENTS

| | | | |
|---|---|---|---|
| 3,496,370 A | | 2/1970 | Haville et al. ............... 250/219 |
| 3,679,314 A | | 7/1972 | Mustert ........................ 356/71 |
| 3,683,943 A | | 8/1972 | De Crepy .................... 133/1 R |
| 3,782,543 A | * | 1/1974 | Martelli et al. ............. 209/555 |
| 3,806,710 A | | 4/1974 | Shigemori et al. ....... 235/92 SB |
| 3,977,785 A | * | 8/1976 | Harris ......................... 355/133 |
| 4,058,194 A | | 11/1977 | Riddle et al. |
| 4,296,326 A | * | 10/1981 | Haslop et al. ................ 283/70 |
| 4,337,864 A | | 7/1982 | McLean ..................... 209/534 |
| 4,542,829 A | | 9/1985 | Emery et al. ............... 209/534 |
| 4,553,846 A | | 11/1985 | Hilton et al. ................ 356/429 |
| 4,645,936 A | | 2/1987 | Gorgone |
| 4,723,072 A | * | 2/1988 | Naruse ........................ 235/454 |
| 4,881,268 A | * | 11/1989 | Uchida et al. .............. 382/135 |
| 5,260,582 A | | 11/1993 | Danek et al. ............... 250/556 |
| 5,295,196 A | | 3/1994 | Raterman et al. ............. 382/7 |
| 5,367,577 A | | 11/1994 | Gotaas ........................... 382/7 |
| 5,467,405 A | | 11/1995 | Raterman et al. ........... 382/135 |
| 5,483,069 A | * | 1/1996 | Kofune et al. ........... 250/341.8 |
| 5,533,627 A | | 7/1996 | Nordqvist .................... 209/534 |
| 5,607,040 A | | 3/1997 | Mathurin, Sr. .............. 194/207 |
| 5,640,463 A | | 6/1997 | Csulits ......................... 382/135 |
| 5,652,802 A | | 7/1997 | Graves et al. .............. 382/135 |
| 5,678,863 A | | 10/1997 | Knight et al. ............... 283/113 |
| 5,704,491 A | | 1/1998 | Graves ........................ 209/534 |
| 5,757,001 A | | 5/1998 | Burns ..................... 250/339.11 |
| 5,790,697 A | | 8/1998 | Munro et al. ............... 382/135 |

(List continued on next page.)

FOREIGN PATENT DOCUMENTS

| | | | | |
|---|---|---|---|---|
| EP | 0101115 | | 2/1984 | |
| EP | 0797815 | | 7/1998 | |
| GB | 2309781 | | 8/1997 | |
| JP | 2000113269 A | * | 4/2000 | ............ G07D/7/00 |
| WO | WO 93/10511 | | 5/1993 | |
| WO | WO 96/18978 | | 6/1996 | |
| WO | WO 01/25127 | | 4/2001 | |

*Primary Examiner*—Jon Chang
(74) *Attorney, Agent, or Firm*—Ladas & Parry

(57) ABSTRACT

A method for verifying authenticity of a certificate under test, wherein an authentic version of the certificate has a known watermark in a predetermined watermark region thereof. The method includes capturing an image of at least a portion of the watermark region of the certificate under test. A correlation is found between the image of the watermark region and the known watermark. Responsive to the correlation, a portion of the image of the watermark region is registered with the known watermark, and a range of intensity values in the registered portion of the image is measured. A vector is defined in a decision space, the vector having coordinates given by the range of the intensity values and by a value of the correlation between the image of the watermark region and the known watermark. The certificate under test is determined to be authentic if the vector falls within a predefined area of the decision space.

32 Claims, 3 Drawing Sheets

U.S. PATENT DOCUMENTS

| | | | |
|---|---|---|---|
| 5,815,592 A | 9/1998 | Mennie et al. | 382/135 |
| 5,854,673 A * | 12/1998 | Beale et al. | 356/71 |
| 5,867,589 A | 2/1999 | Graves et al. | 382/135 |
| 5,875,259 A | 2/1999 | Mennie et al. | 382/135 |
| 5,909,502 A | 6/1999 | Mazur | 382/135 |
| 5,923,413 A | 7/1999 | Laskowski | 356/71 |
| 5,938,044 A | 8/1999 | Weggesser | 209/534 |
| 5,966,465 A | 10/1999 | Keith et al. | 382/232 |
| 5,992,601 A | 11/1999 | Mennie et al. | 194/207 |
| 6,012,565 A | 1/2000 | Mazur | 194/207 |
| 6,021,883 A | 2/2000 | Casanova et al. | 194/217 |
| 6,026,175 A | 2/2000 | Munro et al. | 382/135 |
| 6,028,951 A | 2/2000 | Raterman | |
| 6,060,108 A | 5/2000 | Burd et al. | 427/7 |
| 6,104,036 A * | 8/2000 | Mazowiesky | 250/556 |
| 6,220,419 B1 | 4/2001 | Mennie | 194/207 |
| 6,241,069 B1 | 6/2001 | Mazur et al. | 194/207 |
| 6,256,407 B1 | 7/2001 | Mennie et al. | 382/135 |
| 6,318,537 B1 | 11/2001 | Jones et al. | 194/346 |
| 6,381,354 B1 | 4/2002 | Mennie et al. | |
| 6,415,040 B1 * | 7/2002 | Linnartz et al. | 382/100 |

* cited by examiner

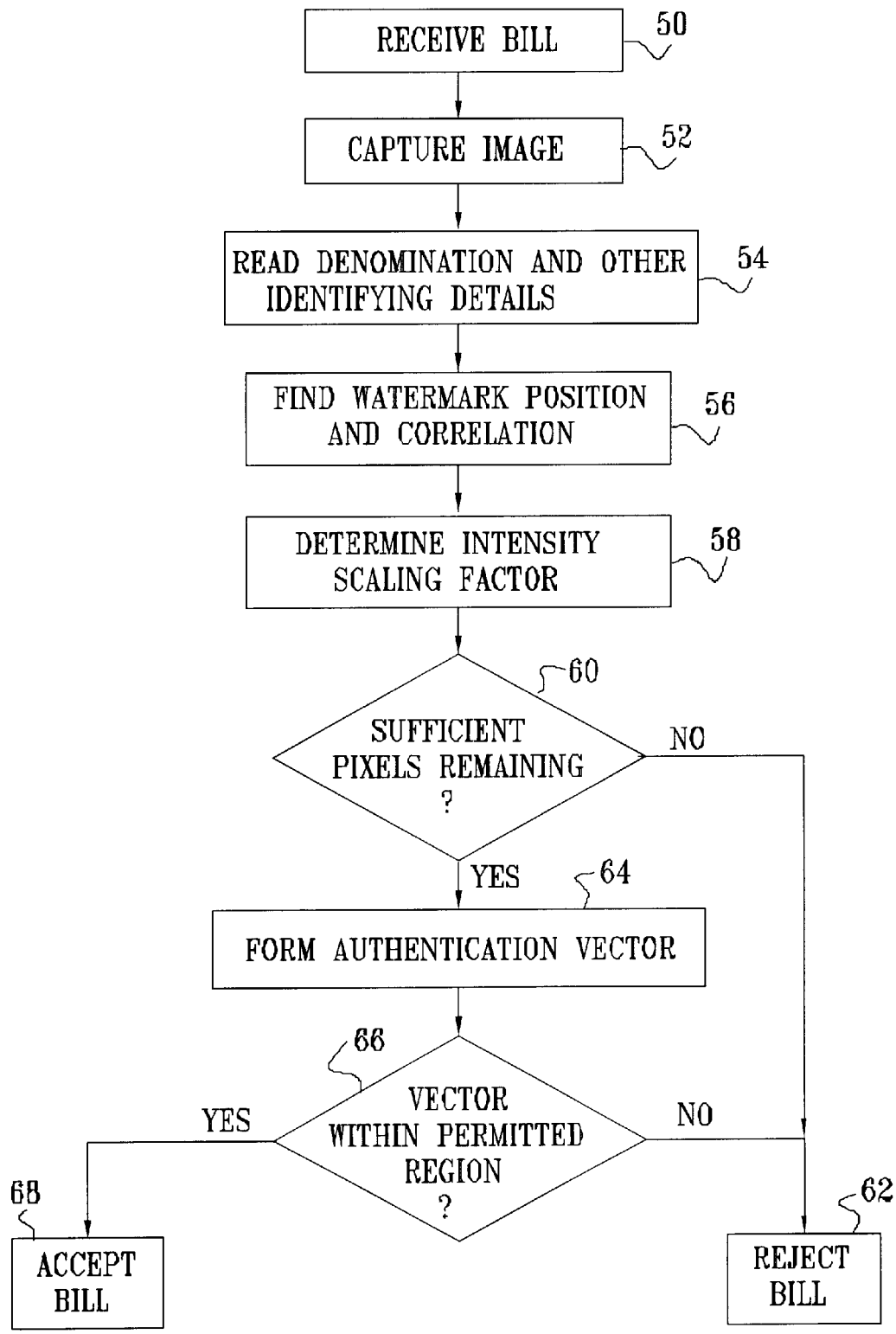

CURRENCY VERIFICATION

FIELD OF THE INVENTION

The present invention relates generally to methods for authenticating currency and other certificates, and specifically to methods of verification based on watermarks.

BACKGROUND OF THE INVENTION

Watermarks are commonly used as a security feature on paper currency, as well as other official certificates. Their advantage in this regard stems from the fact that true watermarks can only be formed during the manufacture of the paper, requiring large, expensive facilities that are not available to most counterfeiters. The watermark comprises areas of high- and low-density paper, created during the manufacturing process. The resulting density differences create an image that is easily visible to the naked eye under back illumination.

Counterfeiters typically attempt to simulate these density differences by means such as printing on the currency bill in a color indistinguishable from the background. Good-quality counterfeit bills produced in this manner may be difficult for the untrained observer to spot. Visual inspection is complicated by the fact that on many types of bills, the watermark is covered by printing on one or both sides of the bill. The watermark may also be obscured (intentionally or not) by dirt and stray markings on the bill. There is therefore a need for automated watermark authentication devices that overcome the limitations of visual inspection.

A variety of methods of currency verification based on automated watermark inspection are known in the art. For example, U.S. Pat. No. 5,854,673, whose disclosure is incorporated herein by reference, describes a method for authenticating watermarked paper based on transiently heating the paper. A thermal imager captures an image of the paper, and the change in the thermal image over time is observed in order to determine whether or not the watermark is authentic. As another example, U.S. Pat. No. 4,296,326, whose disclosure is incorporated herein by reference, describes an apparatus and method for detecting a genuine watermark using ultraviolet radiation. The fluorescence characteristics of a currency note are observed while the note is subjected to the radiation.

U.S. Pat. No. 6,104,036, whose disclosure is incorporated herein by reference, describes an apparatus and method for detecting both a watermark and a security thread in a currency note. (The security thread, commonly used in U.S. notes, indicates the denomination of the note.) Optical sensing circuits positioned on both sides of a currency note measure both transmissive and reflective characteristics. A difference signal between the transmissive and reflective light signals is compared to a series of known difference signals to determine the authenticity of the note.

Similarly, U.S. Pat. No. 5,923,413, whose disclosure is likewise incorporated herein by reference, describes a bank note denominator and validator that operates by comparing transmitted and reflected light signals from a currency note, using sensors positioned on either side of the note. Multiple emitters illuminate the note at different wavelengths in sequence. The measured values of transmission and reflection at the different wavelengths are compared to templates of stored values for known note types. The template matching results are used to determine the denomination of the note and to identify counterfeits.

Other methods of watermark-based currency note authentication are described in Japanese patent publications JP 0113269, JP 1009589, JP 2148382, JP 3191495, JP 7272041 and JP 8287313, whose disclosures are incorporated herein by reference.

Other optical methods for currency authentication are also known in the art. For example, U.S. Pat. No. 5,367,577, whose disclosure is incorporated herein by references, describes a method for testing genuineness of paper bills based on detecting reflected and scattered light from the bills in different narrow wavelength bands. The differences in measured intensity are indicative of differences in the printing process used to make counterfeit notes relative to that used for genuine notes. U.S. Pat. Nos. 3,496,370 and 3,679,314, whose disclosures are also incorporated herein by reference, likewise describe methods for testing bills based on detecting light of different colors that is reflected and/or transmitted by the bills.

SUMMARY OF THE INVENTION

It is an object of some aspects of the present invention to provide devices and methods for testing the authenticity of watermarked certificates, and particularly currency bills.

It is a further object of some aspects of the present invention to provide devices for currency authentication that are simple and low in cost while providing reliable detection of counterfeits.

In preferred embodiments of the present invention, an optical bill validator captures an image of a currency bill under test, preferably using a single light source and detector to sense and process light transmitted through the bill. Based on the type and denomination of the bill (which are preferably determined automatically by analyzing the image), the validator chooses a template corresponding to the watermark that should appear on the bill. The validator correlates the watermark area of the bill under test with the template, in order to register the image of the watermark on the bill with the template and to calculate a correlation value indicating the quality of the match between the bill and the template. The validator then determines the range of intensity values in the registered watermark image, and calculates a scaling factor relating this intensity range to that of the template.

To determine the authenticity of the bill, the validator maps the pair of correlation and scaling factor values to a corresponding vector in a multi-dimensional decision space. Optionally, other factors, such as measurements of the color of the bill, may be used as coordinates of the vector, as well. Pixels in the image of the bill that are substantially brighter or dimmer than the template (typically due to marks or stains on the bill) are excluded from consideration. Based on previous testing, a certain region of the decision space is known to contain the vectors corresponding to most or all valid bills of this type and denomination, while excluding all (or nearly all) known counterfeits. If the vector for the current bill under test falls within this certain region, the validator judges the bill to be authentic. Otherwise, the bill is rejected.

Although the preferred embodiments described herein are directed to currency verification, the principles of the present invention may similarly be applied to testing of other types of watermarked paper. In this manner, for example, it is possible to authenticate other certificates of value, such as checks and gift certificates, as well as to carry out quality control inspection of watermarked paper items.

There is therefore provided, in accordance with a preferred embodiment of the present invention, a method for verifying authenticity of a certificate under test, wherein an authentic version of the certificate has a known watermark in a predetermined watermark region thereof, the method including:

capturing an image of at least a portion of the watermark region of the certificate under test;

finding a correlation between the image of the watermark region and the known watermark;

responsive to the correlation, registering a portion of the image of the watermark region with the known watermark;

measuring a range of intensity values in the registered portion of the image;

defining a vector in a decision space, the vector having coordinates given by the range of the intensity values and by a value of the correlation between the image of the watermark region and the known watermark; and determining the certificate under test to be authentic if the vector falls within a predefined area of the decision space.

Preferably, capturing the image includes capturing a transmission image by detecting light transmitted through the certificate under test. Alternatively or additionally, capturing the image further includes capturing a reflection image by detecting further light reflected from the certificate under test.

In a preferred embodiment, capturing the image includes illuminating the certificate using first and second light source respectively located on opposing first and second sides of the certificate, and receiving light both from the first source transmitted through the certificate and from the second source reflected from the certificate using a detector on the second side of the certificate. Optionally, illuminating the certificate includes operating the first and second light sources simultaneously, so that the image captured by the detector includes both the transmitted and the reflected light. As a further option, operating the first and second light sources includes operating one of the sources substantially continuously and the other of the sources intermittently, while the detector is receiving the transmitted and the reflected light.

Typically, the certificate includes a currency bill. Preferably, finding the correlation includes determining a denomination of the bill, and choosing the known watermark with which the correlation is to be found from among a set of such known watermarks, responsive to the denomination. In a preferred embodiment, finding the correlation further includes identifying a manufacturer of the bill, and choosing the known watermark from among the set depending on the manufacturer.

Preferably, finding the correlation includes identifying an interfering image element, not belonging to the watermark, in the image of the watermark region, and computing the correlation while excluding the interfering image element from the correlation. Further preferably, measuring the range of the intensity values includes determining the range of the intensity values in the region exclusive of the interfering image element. Additionally or alternatively, identifying the interfering image element includes finding pixels in the image of the watermark region having intensity values outside a predetermined range that is associated with the known watermark. Most preferably, the method includes counting a number of the pixels whose intensity values are outside the predetermined range, and rejecting the certificate if the number exceeds a predefined threshold. Additionally or alternatively, the method includes counting a number of the pixels whose intensity values are within the predetermined range, wherein defining the vector includes defining a further vector coordinate responsive to the number of the pixels.

Preferably, defining the vector includes defining one of the coordinates to be an intensity scaling factor that maps the range of intensity values in the registered portion of the image to the intensity values in the known watermark.

There is also provided, in accordance with a preferred embodiment of the present invention, apparatus for verifying authenticity of a certificate under test, wherein an authentic version of the certificate has a known watermark in a predetermined watermark region thereof, the apparatus including:

an image sensor, which is adapted to capture an image of at least a portion of the watermark region of the certificate under test and to generate an output signal responsive thereto; and an image processor, coupled to receive the output signal, and adapted to process the signal so as to find a correlation between the image of the watermark region and the known watermark and, responsive to the correlation, to register a portion of the image of the watermark region with the known watermark, the image processor being further adapted to measure a range of intensity values in the registered portion of the image, to define a vector in a decision space, the vector having coordinates given by the range of the intensity values and by a value of the correlation between the image of the watermark region and the known watermark, and to determine the certificate under test to be authentic if the vector falls within a predefined area of the decision space.

The present invention will be more fully understood from the following detailed description of the preferred embodiments thereof, taken together with the drawings in which:

BRIEF DESCRIPTION OF THE DRAWINGS

FIG. 3 is a flow chart that schematically illustrates a method for authenticating a currency bill, in accordance with a preferred embodiment of the present invention.

DETAILED DESCRIPTION OF PREFERRED EMBODIMENTS

Figure 1:
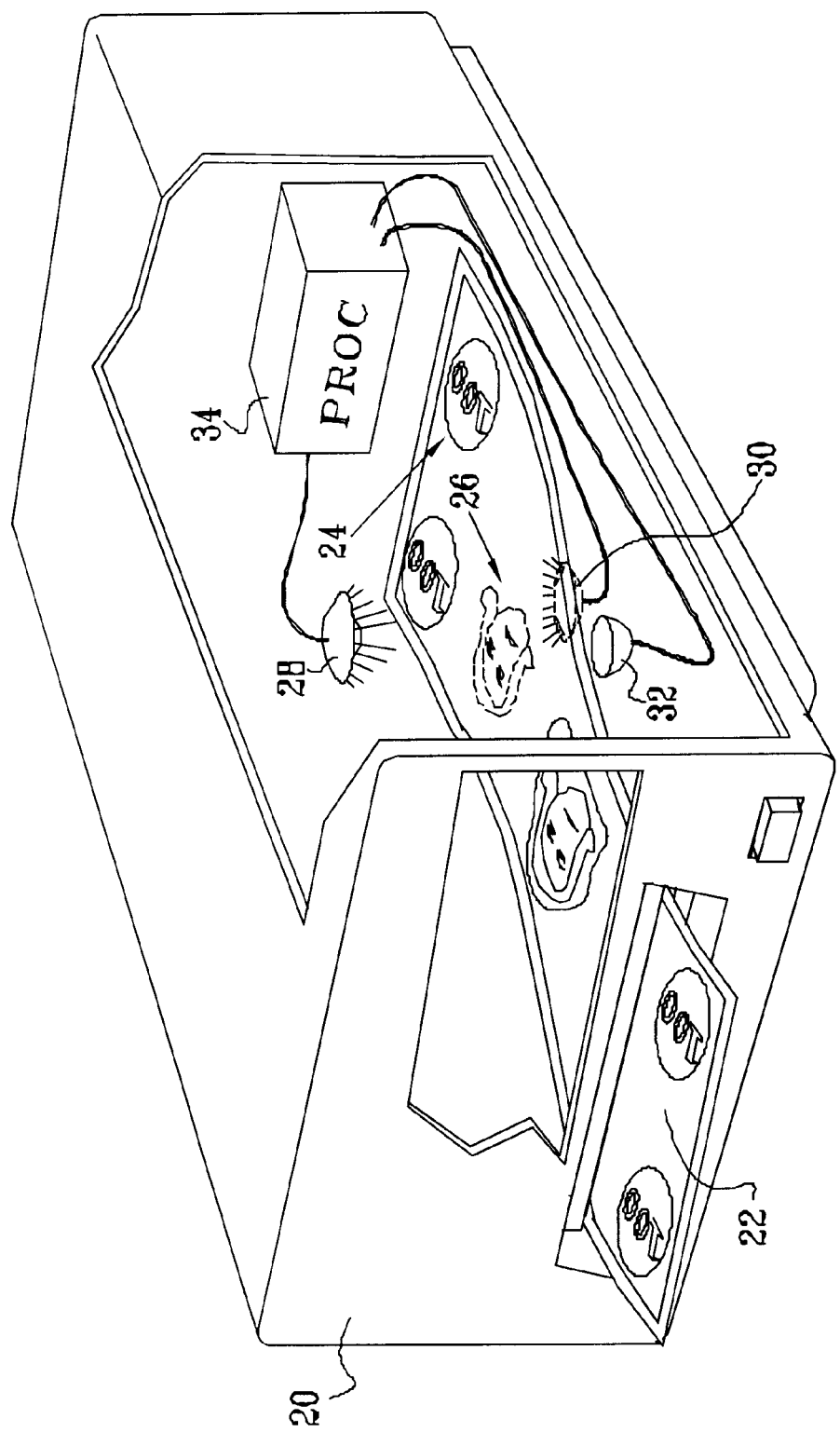
FIG. 1 is a schematic, pictorial, cutaway view of a currency bill validation device, in accordance with a preferred embodiment of the present invention.

FIG. 1 is a schematic, pictorial, cutaway view of a device 20 for validating a currency bill 22, in accordance with a preferred embodiment of the present invention. The structure of device 20 shown in the figure is simplified so that the functional elements essential to the practice of the present invention can be seen clearly. These elements may be integrated into currency-handling equipment of different kinds, including validation devices for single bills, high-speed counting/validation devices, vending machines and point-of-sale registers, as well as in other applications. The optical, mechanical and electronic parts that must be added to the elements shown in FIG. 1 to adapt the validating device for use in these various applications will be apparent to those skilled in the art.

Bill 22 is characterized by a denomination 24 and a watermark 26, among other characteristics. When the bill is inserted into device 20, a first light source 28 illuminates the bill, and a detector 32 captures an image on the light transmitted through the bill. Optionally, light source 28 is operated in alternation with a second light source 30 on the same side of the bill as detector 32, so that the detector captures an additional image of light reflected from bill 22. As another alternative, the two light sources may be operated simultaneously, so as to generate a composite image at the detector. As a further alternative, one of the light sources may operate continuously, while the other is alternately turned on and off, so as to generate both composite and non-composite images.

An image processing unit 34, typically comprising a microprocessor, memory and peripheral circuits, as are known in the art (not shown in the figures), controls light sources 28 and 30 and receives image signals from detector 32. Unit 34 digitizes and processes the image signals in order to determine the denomination and, optionally, other characteristics of the bill. It then analyzes the image of watermark 26 to verify the authenticity of the bill, as described hereinbelow.

Light sources 28 and 30 may operate in the visible, ultraviolet or infrared range, or in a combination of these ranges. The light sources may be configured for either broadband emission or narrowband emission in one or more selected spectral bands. Preferably, light source 28 comprises an infrared source, such as a high-intensity infrared light emitting diode (LED).

Detector 32 preferably comprises an image sensor, such as a charge coupled device (CCD) or photodiode array, or sensors based on other types of photodetectors known in the art. The image sensor may comprise a two-dimensional matrix of photosensors, or it may alternatively comprise a line array, arranged so as to scan bill 22 in a "pushbroom" mode as the bill passes through device 20. Detector 32 may be positioned so that a faceplate of the detector contacts the surface of bill 22 as the bill passes through device 20. In this way, the array of photosensors forms an image of the bill without a need for intervening imaging optics. Alternatively, the detector may be spaced away from the bill, with a suitable objective lens.

Figure 2:
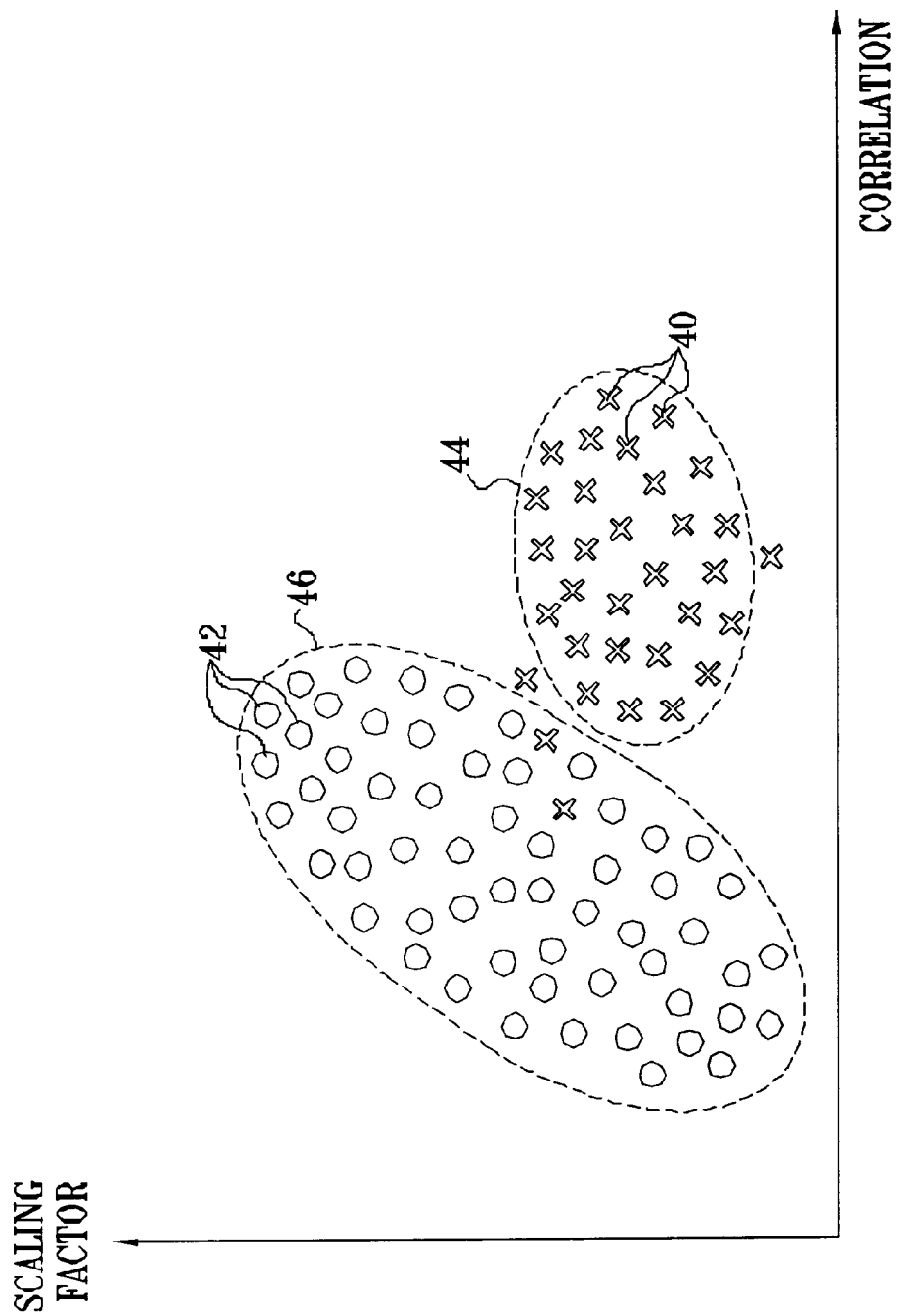
FIG. 2 is a Cartesian plot of points in a decision space used in validating currency bills, in accordance with a preferred embodiment of the present invention.

FIG. 2 is a Cartesian plot showing results of image analysis performed on a large sample of bills of the type shown in FIG. 1, in accordance with a preferred embodiment of the present invention. The bills included both genuine and counterfeit bills, wherein data points 40 in the figure, marked by "X," represent genuine bills, while data points 42, marked by "O," represent counterfeit bills. The Cartesian plane shown in the figure is used as a decision space in validating bill 22, in the manner described below.

For each bill in the sample, the image of watermark 26 is registered with a corresponding reference template. The template is typically an image taken from a new, clean bill, which is known to be genuine. When there are known to be manufacturing variations in the watermark on bills of a given type, such as when the paper is supplied by different factories with slightly different manufacturing processes, several different templates may be used, with the template that gives the best match selected in each case.

To register the watermark image with the template, a pixel-by-pixel correlation function is computed between the watermark image and the template. For the purpose of this correlation, the watermark image is preferably divided up into a grid of small regions. The range of pixel intensity values in each region is normalized to that of the corresponding region in the template image. Regions of the watermark image in which the range of intensity values deviates significantly from that in the template image are eliminated from consideration. (These are typically areas of the bill that are badly defaced and therefore unusable.) The correlation value is then computed for each region, and the regional correlations are optionally normalized, and are then added together, preferably by a weighted sum, to give the overall correlation value for the watermark image.

This correlation is computed for a number of different relative displacements between the watermark image and the template. The displacement that gives the highest correlation value is considered to be the correct one for registration of the watermark image taken from the bill. This maximum correlation value is the abscissa of each data point 40 or 42 in FIG. 2.

Next, an intensity scaling factor of the watermark image (i.e., of the portion of the image of the bill that is in registration with the reference template) is measured. This measurement gives the ordinate of each data point in FIG. 2. This scaling factor is defined as the multiplicative factor that gives the best linear mapping of the range of pixel intensity values in the watermark image to that in the template.

It can be seen in FIG. 2 that genuine bills typically have a higher value of correlation with the reference template than do counterfeit bills, as would be expected. It will be observed, however, that correlation alone is not an adequate discriminator between genuine and counterfeit bills, since some of counterfeit data points 42 (presumably belonging to high-quality counterfeits) have a greater correlation value than do some of the worst genuine bills. The large range of correlation values among the genuine bills stems, inter alia, from the wear and staining to which bills in circulation are subject. By the same token, the scaling factor alone also cannot be used to discriminate between genuine and counterfeit bills, since the imitation "watermarks" on some of the counterfeit bills have similar intensity scaling to those of the genuine bills.

A region 44 can be defined in the Cartesian decision space, however, in which all the data points are genuine data points 40. In other words, a vector is formed for each bill with coordinates given by the correlation value and scaling factor measured for that bill. If the vector falls within region 44, that bill can be considered authentic. Counterfeit data points 42 fall within another region 46, which does not overlap with region 44. Typically, the vectors belonging to some genuine bills will fall outside region 44, as shown in FIG. 2. As a result, device 20 will reject these bills as possible counterfeits, and they will have to be rechecked by a human expert. This result is inconvenient, but acceptable, as long as not too many genuine bills are rejected. It is far more important that as few as possible counterfeit bills be incorrectly classified as genuine.

FIG. 3 is a flow chart that schematically illustrates a method used by device 20 in authenticating bill 22, in accordance with a preferred embodiment of the present invention. The method is based on the decision space shown in FIG. 2. It is initiated for each bill that device 20 receives, at a bill input step 50. The device captures a transmission image of the bill, using light source 28 and detector 32, at an image capture step 52. Alternatively or additionally, a reflection image or composite image (combining reflected and transmitted light) may be captured using light source 30, as described above. Unlike systems known in the art, device 20 needs only the single detector 32 to capture both the transmission and the reflection images.

Processing unit 34 analyzes the captured image to determine denomination 24 of bill 22, at a bill identification step 54. It may be necessary for the processing unit to determine other identifying details, as well, such as the type of currency (if device 20 is capable of accepting currency from different countries) or the plant at which the paper for bill 22 was manufactured. The latter information can sometimes be derived from the serial number or other feature on the bill. The bill denomination and type are used to choose the reference template to be employed in subsequent steps of the method.

Processing unit 34 registers the image of watermark 26 on bill 22 with the selected reference template, at a watermark positioning step 56. For this purpose, the processing unit performs pixel-by-pixel correlation computations between the template and the image of the bill, at different relative displacements. As described above, this computation is performed by dividing the image into small regions, and determining the correlation for each region. Pixels in the image of bill 22 that are far outside the range of expected intensities of watermark 26, as determined by the template, are not considered in finding the correlation. These excluded pixels typically appear very dark in the transmission image formed by detector 32, due to spurious marks or stains on the watermark region of the bill. Preferably, excessively bright pixels are also excluded. The displacement that gives the maximal value of the correlation, while disregarding these outlier pixels, is considered to be the correct one. The portion of the image of the bill that is within the bounds of the watermark in the reference template is then taken to be the actual image of the watermark for the purpose of subsequent calculations.

The processing unit next determines the intensity scaling factor of the registered image of the watermark relative to the template, at a scaling factor determination step 58. This step uses the definition of intensity scaling given above. Again, pixels whose intensities are outside the expected range determined by the template are excluded. The processing unit counts the number of excluded pixels, and checks whether the number of valid pixels remaining in the watermark image is above a predetermined minimum, at a threshold checking step 60. If the number of valid pixels is less than this minimum, device 20 rejects bill 22, at a rejection step 62. Although the bill may be genuine, it is too badly defaced for it to be automatically verified.

As long as a sufficient number of valid pixels remains, processing unit 34 forms the authentication vector for bill 22, at a vector definition step 64. The coordinates of the vector include the correlation value and the scaling factor, measured in the preceding steps of the method. Optionally, the vector may have additional coordinates (in which case the decision space becomes a three- or higher-dimensional space). Typically, the number of valid pixels, as determined at step 58, is used as one of these additional coordinates. Other coordinates that may be used include measures of reflected light intensity characteristics, as well as color features, such as the ratio of transmitted or reflected intensities from points on bill 22 at two or more different colors. Other measures that can be used as vector coordinates will be apparent to those skilled in the art.

Processing unit 34 checks the resultant vector, to determine whether it falls within the permitted region of the decision space, such as region 44 (FIG. 2), at a decision step 66. If the vector is within the permitted region, device 20 accepts the bill as authentic, at an acceptance step 68. Otherwise, the bill is rejected at step 62.

Although device 20 and the methods described with reference thereto are directed to currency verification, the principles of the present invention may similarly be applied to testing of other types of watermarked paper, such as checks and gift certificates, as well as to quality control inspection of watermarked paper items. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for verifying authenticity of a certificate under test, wherein an authentic version of the certificate has a known watermark, the method comprising:

capturing an image of at least a portion of a predetermined watermark region of the certificate under test;

finding a correlation between the image of the watermark region and a template of the known watermark;

responsive to the correlation, registering a portion of the image of the watermark region with the template;

measuring a range of intensity values in the registered portion of the image;

defining a vector in a decision space, the vector having coordinates given by the range of the intensity values and by a value of the correlation between the image of the watermark region and the template; and determining the certificate under test to be authentic if the vector falls within a predefined area of the decision space.

2. A method according to claim 1, wherein capturing the image comprises capturing a transmission image by detecting light transmitted through the certificate under test.

3. A method according to claim 2, wherein capturing the image further comprises capturing a reflection image by detecting further light reflected from the certificate under test.

4. A method according to claim 3, wherein capturing the transmission image comprises illuminating the certificate using a first light source located on a first side of the certificate, and capturing the transmitted light using a detector on a second side of the certificate, opposite the first side, and wherein capturing the reflection image comprises illuminating the certificate using a second light source located on the second side of the certificate, and capturing the reflected light using the same detector that is used to capture the transmitted light.

5. A method according to claim 1, wherein capturing the image comprises illuminating the certificate using first and second light source respectively located on opposing first and second sides of the certificate, and receiving light both from the first source transmitted through the certificate and from the second source reflected from the certificate using a detector on the second side of the certificate.

6. A method according to claim 5, wherein illuminating the certificate comprises operating the first and second light sources simultaneously, so that the image captured by the detector comprises both the transmitted and the reflected light.

7. A method according to claim 6, wherein operating the first and second light sources comprises operating one of the sources substantially continuously and the other of the sources intermittently, while the detector is receiving the transmitted and the reflected light.

8. A method according to claim 1, wherein the certificate comprises a currency bill.

9. A method according to claim 8, wherein finding the correlation comprises determining a denomination of the bill, and choosing the template with which the correlation is to be found from among a set of templates of such known watermarks, responsive to the denomination.

10. A method according to claim 9, wherein finding the correlation further comprises identifying a manufacturer of the bill, and choosing the template from among the set depending on the manufacturer.

11. A method according to claim 1, wherein finding the correlation comprises identifying an interfering image element, not belonging to the watermark, in the image of the watermark region, and computing the correlation while excluding the interfering image element from the correlation.

12. A method according to claim 11, wherein measuring the range of the intensity values comprises determining the range of the intensity values in the region exclusive of the interfering image element.

13. A method according to claim 11, wherein identifying the interfering image element comprises finding pixels in the image of the watermark region having intensity values outside a predetermined range that is associated with the template.

14. A method according to claim 13, and comprising counting a number of the pixels whose intensity values are outside the predetermined range, and rejecting the certificate if the number exceeds a predefined threshold.

15. A method according to claim 13, and comprising counting a number of the pixels whose intensity values are within the predetermined range, wherein defining the vector comprises defining a further vector coordinate responsive to the number of the pixels.

16. A method according to claim 1, wherein defining the vector comprises defining one of the coordinates to be an intensity scaling factor that maps the range of intensity values in the registered portion of the image to the intensity values in the template.

17. Apparatus for verifying authenticity of a certificate under test, wherein an authentic version of the certificate has a known watermark, the apparatus comprising:
   an image sensor, which is adapted to capture an image of at least a portion of a predetermined watermark region of the certificate under test and to generate an output signal responsive thereto; and
   an image processor, coupled to receive the output signal, and adapted to process the signal so as to find a correlation between the image of the watermark region and a template of the known watermark and, responsive to the correlation, to register a portion of the image of the watermark region with the template, the image processor being further adapted to measure a range of intensity values in the registered portion of the image, to define a vector in a decision space, the vector having coordinates given by the range of the intensity values and by a value of the correlation between the image of the watermark region and the template, and to determine the certificate under test to be authentic if the vector falls within a predefined area of the decision space.

18. Apparatus according to claim 17, wherein the image comprises a transmission image, and wherein the image sensor is arranged to capture the transmission image by detecting light transmitted through the certificate under test.

19. Apparatus according to claim 18, wherein the image further comprises a reflection image, and wherein the image sensor is arranged to capture the transmission image by detecting further light reflected from the certificate under test.

20. Apparatus according to claim 19, and comprising a first light source located on a first side of the certificate and a second light source located on a second side of the certificate, opposite the first side, both of which light sources are arranged to illuminate the certificate, and wherein the image sensor is located on the second side of the certificate, so as to capture the transmission image while the certificate is illuminated by the first light source, and to capture the reflection image while the certificate is illuminated by the second light source.

21. Apparatus according to claim 17, and comprising first and second light sources respectively located on opposing first and second sides of the certificate, both of which light sources are arranged to illuminate the certificate, and wherein the image sensor is located on the second side of the certificate, so as to receive light both from the first source transmitted through the certificate and from the second source reflected from the certificate.

22. Apparatus according to claim 21, wherein the first and second light sources are operative simultaneously, so that the image captured by the image sensor comprises both the transmitted and the reflected light.

23. Apparatus according to claim 22, wherein one of the sources is operative substantially continuously, while the other of the sources is operative intermittently, while the image sensor is receiving the transmitted and the reflected light.

24. Apparatus according to claim 17, wherein the certificate comprises a currency bill.

25. Apparatus according to claim 24, wherein the image processor is adapted to determine a denomination of the bill, and to choose the template with which the correlation is to be found from among a set of templates of such known watermarks, responsive to the denomination.

26. Apparatus according to claim 25, wherein the image processor is further adapted to identify a manufacturer of the bill, and to choose the template from among the set depending on the manufacturer.

27. Apparatus according to claim 17, wherein the image processor is adapted to identify an interfering image element, not belonging to the watermark, in the image of the watermark region, and to compute the correlation while excluding the interfering image element from the correlation.

28. Apparatus according to claim 27, wherein the image processor is adapted to determine the range of the intensity values in the region exclusive of the interfering image element.

29. Apparatus according to claim 27, wherein the image processor is adapted to identify the interfering image element by finding pixels in the image of the watermark region having intensity values outside a predetermined range that is associated with the template.

30. Apparatus according to claim 29, wherein the image processor is adapted to count a number of the pixels whose intensity values are outside the predetermined range, and to reject the certificate if the number exceeds a predefined threshold.

31. Apparatus according to claim 29, wherein the image processor is adapted to count a number of the pixels whose intensity values are within the predetermined range, and to define a further coordinate of the vector responsive to the number of the pixels.

32. Apparatus according to claim 17, wherein the image processor is adapted to define one of the coordinates to be an intensity scaling factor that maps the range of intensity values in the registered portion of the image to the intensity values in the template.

* * * * *